Oct. 21, 1969     K. H. FULMER     3,473,473
PUMP CONTROL MEANS

Filed April 22, 1968     2 Sheets-Sheet 1

KEITH H. FULMER
BY
Richard H. Geib
ATTORNEY

Oct. 21, 1969　　　　K. H. FULMER　　　　3,473,473
PUMP CONTROL MEANS

Filed April 22, 1968　　　　　　　　　　2 Sheets-Sheet 2

KEITH H. FULMER
Richard G. Geib
ATTORNEY

United States Patent Office 3,473,473
Patented Oct. 21, 1969

3,473,473
PUMP CONTROL MEANS
Keith H. Fulmer, South Bend, Ind., assignor to The
Bendix Corporation, a corporation of Delaware
Filed Apr. 22, 1968, Ser. No. 723,177
Int. Cl. F04b 49/08, 19/22; F04d 15/00
U.S. Cl. 103—41                              12 Claims

ABSTRACT OF THE DISCLOSURE

A pump means having a pressure responsive plunger operating a spring biased inlet valve carried by a spring retainer with means to eliminate the effect of external vibration on the operation of the inlet valve.

SUMMARY

It has been observed that when simplifying a pump means for the development of hydraulic pressure for utilization in an automotive brake system, for example, that the vibrations of the vehicle engine as well as the vibrations of the single reciprocating plunger and the pressure pulsations can be additive. It has been found that this creates a simple harmonic motion in the spring means forming a reference force on a pressure responsive valve means adapted to limit the pressure supply of the pump by closing the inlet for the pump whenever sufficient pressure is developed for the braking system.

A principal object of this invention is to provide means for eliminating the simple harmonic motions within the resilient member forming the reference pressure force in the control of the inlet valve. More particularly, it is a detailed object of this invention to prevent acceleration (and therefore also the restoring force) within the resilient member from interfering with the control of the valve means.

A still further object of this invention is to incorporate a restraining means for a coil spring which is assembled in a preloaded condition such that the ends are fixed, which restraining means will eliminate the harmonic displacement of intermediate coils of the spring.

DRAWING DESCRIPTION

Other objects and advantages of this invention will most certainly occur to those skilled in the art to which this invention relates from a description of the drawing in which.

DETAILED DESCRIPTION

Figure 1:
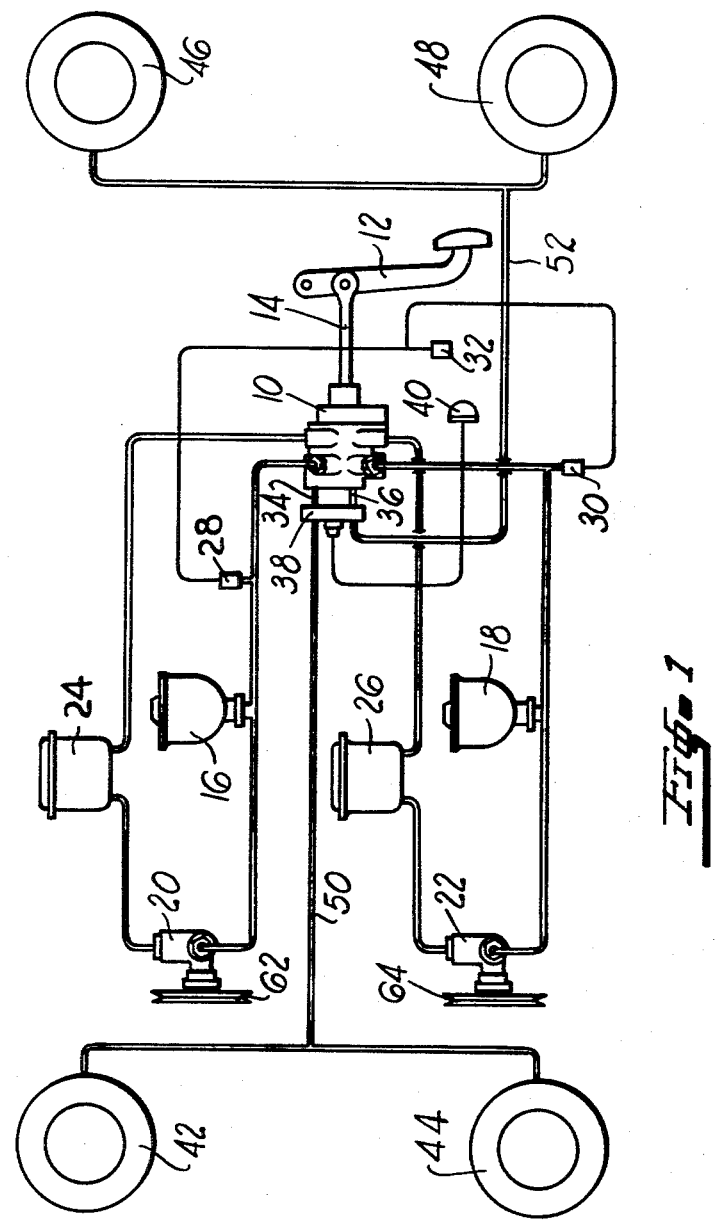
FIGURE 1 is a schematic illustration of a full power hydraulic braking system employing a pump means in which the improvements of this invention have been found to be particularly advantageous.

For some time now, full power hydraulic braking systems have been the object of much attention within the braking industry for automotive vehicles. The obvious advantages of unlimited displacement with the ever-increasing need to provide maximum braking effectiveness would appear to be within the skill of the art at this time with such systems. Such a system is shown in FIGURE 1 incorporating a brake control valve 10 operated by a brake pedal 12 via the push rod connecting link 14 therebetween. This valve is supplied with fluid pressure from a pair of accumulators 16 and 18 who are independently pressurized by the two pumps 20 and 22. In order to insure an adequate fluid supply, separate reservoirs 24 and 26 are provided in each separate section of the braking system. In addition, the pressure responsive switches 28 and 30 are provided in the braking systems to provide an indication, as by an indicator 32 to the operator of the adequacy of the pressure for braking. The control valve 10 is essentially two valves in one; i.e., separate fluid pressures may be delivered therefrom via conduits 34 and 36 leading to a warning switch 38 which compares these pressures and signals the operator of the vehicle by an indicator 40 if one braking pressure has not been sufficiently supplied by the control valve 10 for the operation of the associated wheel brakes. The vehicle wheel brakes are shown with respect to the schematic illustration of front wheels 42 and 44 and rear wheels 46 and 48 to be separately linked to the control valve 10 by means of conduits 50 and 52, respectively.

As will be readily understood by those skilled in the art, the pressure differential switch 38 as well as the pressure responsive switches 28 and 30 are interposed in an electrical system to be between the electrical power supply and the indicators 40 and/or 32, respectively. In other words, the failure to supply substantially equal pressure to the front wheel brakes and the rear wheel brakes will close an electrical circuitry for the indicator 40. Similarly, the failure of either the pump 20 or the pump 22 to develop sufficient supply pressure within the accumulator 16 or 18, respectively, will cause either the switch 28 or the switch 30 to activate by closing the electrical circuitry for the indicator 32.

Figure 2:
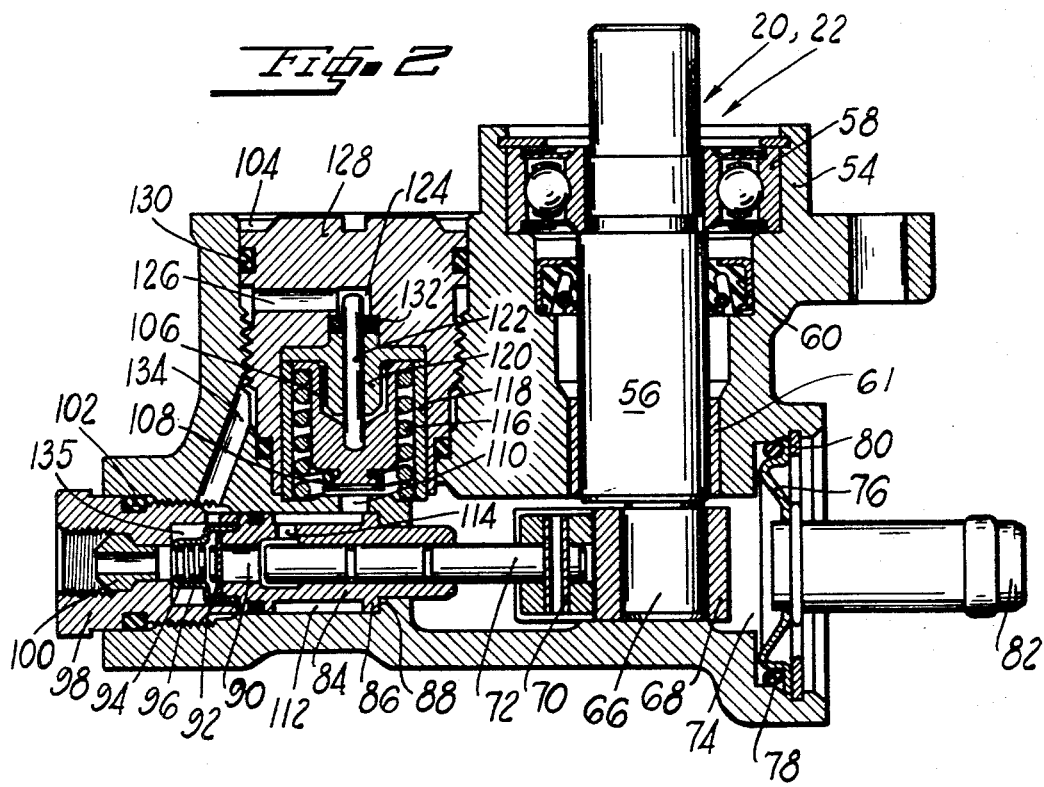
FIGURE 2 is a cross sectional view of a pump means such as is schematically illustrated in FIGURE 1 showing the elements of this invention with respect to the inlet control valve thereof.

Many different approaches as to the design of the pumps 20 and 22 have been tried by various manufacturers such as ported induction schemes and/or pressure responsive inlet control valves for the pumps. In the realization of the need to simplify the pumping mechanism by eliminating the number of parts and the unnecessary moving parts, it has been observed that the most likely successful pumping means will be with respect to those designs incorporating pressure responsive inlet valves for terminating the supply of hydraulic fluid to the pumping chamber, whenever the predetermined pressure has been reached and is being maintained in the accumulator 16 and/or 18 of FIGURE 1. Such a pump would taken on the design characteristics as seen in FIGURE 2 wherein a simple housing 54 is formed to sealingly mount a shaft 56 as by thrust end bearings 58 and seal 60. A sleeve type bearing 61 is provided between the shaft 56 and housing 54. As may be implied from FIGURE 1 and is certainly intended, in any event, this shaft 56 is mounted with pulleys 62 and 64 which are belt driven by the automobile engine or truck engine, as the case may be. If desired, one of the shafts of one of the pumps could be connected to electrical motor so that there would be fail-safe pumping capability in the event that the engine would not be running. The shaft 56 is provided with an eccentric 66 about which a pitman 68 is assembled when the shaft 56 is inserted into the housing. The pitman is pinned by a pin 70 to a pump piston 72 within bore 74 of the housing 54 forming an area for the supply of fluid from reservoirs 24 and/or 26.

This area 74 is closed by means of cap 76 having seal 78 held in place against a shoulder of the housing by snap ring 80. The cap 76 is provided with a nipple fitting 82 to which a line from the reservoirs 24 and/or is connected, as seen in FIGURE 1. From the left end of the housing 54 as viewed in the drawing, a pumping cylinder 84 is inserted until a flange 86 thereof abuts on a shoulder 88 of the housing 54. Upon this assembly, the pumping piston 72 is slidably oriented within the cylinder 84 to create a pumping chamber 90. The pumping chamber 90 is then closed by a flapper type check valve 92 carried within a retainer 94 and urged over the open end of the pumping chamber 90 by a spring 86. Thereafter a plug 98 having a ferrule 100 for the connection of a conduit therewith is threadedly related to the housing with a seal 102 sealing its juncture therewith. The plug 98 is provided with an opening forming the discharge port for the pump.

Still another cavity 104 is provided in the housing 54 within which an inlet control valve mechanism is assembled. This mechanism comprises a valve body 106 having an annular resilient valve seat 108 on its lowermost end for cooperation with an inlet port 110 drilled in the housing body to communicate area 74 with an annular space 112 about the pumping cylinder 84 between it and the housing 54. The annular space 112 is communicated via an inlet port 114 in the cylinder 84 to the pumping chamber 90 ahead of the piston or plunger, as it may be termed, 72. The valve body is urged upwardly away from the inlet 110 by means of spring 116. About the spring a sleeve 118 is snugly fitted with the peripheral surface of the coils of the spring to maintain the column profile of the spring, as will be hereinafter discussed in further detail. Over this, a seal retainer body 120 is placed, which retainer slidably receives a plunger 122 connected at its lowermost end with the body 106. Plunger 122 extends upwardly into a chamber 124 provided by a cross-drilled passage 126 in plug 128 threadedly assembled within the cavity 104 with a seal 130 to locate the valve mechanism and seal the cavity 104. However, prior to the assembly of the plug 128, an O-ring seal 132 may be placed over the retainer 120 or fitted within the stepped bore in the plug 128 to seal with the surface of the plunger 122 and maintain, therefore, the integrity of the chamber 124.

A passage 134 is provided in the housing 54 communicating a chamber 135 within which discharge pressure is present to the cross-drilled passage 126 in the plug 128. It should be realized by those skilled in the art that this passage 134 opens to the threaded area on one side thereof of the plug 128. This side of the threaded area of the plug 128 may be notched in order to insure fluid communication to the passage 126 from the passage 134. Also, it is visualized that with adequate tolerance control in manufacturing the notches within this side of the threads of the plug 128 may be liminated to provide a spiral fluid passage which would have the effect of damping the pulsations from the pumping chamber 90 discharged past the flapper valve 92 on each cycle of the piston or plunger 72.

Figure 3:
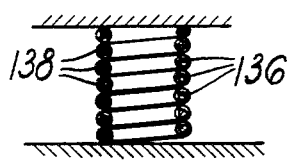
FIGURE 3 is a cross sectional view of a spring means modified in accordance with another embodiment of this invention for accomplishing the desired end results.

Another way to maintain the column profile for the spring 116 is shown in FIGURE 3 wherein the spring is shown to have its coils 136 each coated with a rubber coating 138 whereby the spaces between the coils are closed upon assembly and any displacement laterally with respect to the longitudinal axis of the spring will be braked by the frictional resistance of the coating surfaces on each other.

Figure 4:
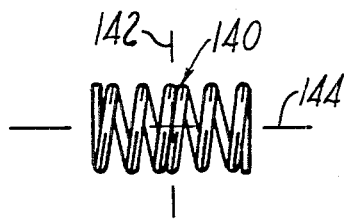
FIGURE 4 is a side view of still another spring means embodying the principles of this invention; and, FIGURE 5 is the opposite side view of the spring of FIGURE 4 showing particularly how this spring is modified in accordance with the principles of this invention to bring about the desired results ttherefof.
Figure 5:
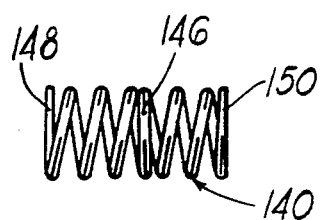

With regard to FIGURE 4, there is shown a spring 140 which may be substituted for the sleeve contained spring 116 and the coated spring coils 136 in the pumps 20 and/or 22. Spring 140 is of novel design in having an intermediate coil on a horizontal line 142 normal to the axis 144 of the spring 140. This is more particularly shown as coil 146 in FIGURE 5 which extends substantially 180° around the circumference of the spring 140 intermediate its ends 148 and 150.

It has been realized that with all the vibratory excitations within an automobile that they are additive on spring components of the automobile to create simple harmonic motions of the coils of the spring intermediate the ends. That is to say that it has been realized that the center coils of a spring, due to the fixed nature of the ends of the spring, tend to oscillate in a lateral plane with respect to the axis of the spring, if the vibration excitation of all the various vibrating elements feed through the structure to be absorbed in such springs. The simple harmonic motion created is due to the acceleration (and therefore also the restoring force) which is proportional to the displacement of the vibrating body from its position of rest. When, as in the case of pressure control inlet means, there is need for refined control, and also for the simplified utilization of spring means in opposition to pressure responsive members providing such refined control, the forces which would have even the slightest effect on the positioning of the valve means in the refined manner necessary must be eliminated. The various embodiments suggested by this invention described above accomplishes such a desirable end that has not heretofore been observed within the prior art.

Having fully described an operative structure for my invention and its functional advantages when so constructed, it is now desired to set forth the intended protection sought by these Letters Patent in the appended claims.

I claim:

1. In a pump inclusive of a mechanism in a pumping chamber to pressurize fluid from an inlet and deliver same via a valved discharge port, a means to valve the inlet responsive to discharge pressure, said means comprising:

a valve means having a body portion subjected to inlet pressure;

a spring to bias said valve means away from said inlet, including a means for said spring to suppress the effect to fluid pulsations and external vibrations thereon causing simple harmonic motion of the spring along its axis;

a plunger operatively connected to said valve means on one end, said plunger having another end within a chamber; and means to port discharge pressure to said chamber to react on said plunger in opposition to the spring which is therefore reactive on the one end of said plunger such that said plunger moves said valve means to close the inlet to the pumping chamber whenever discharge pressure is above a certain valve.

2. The structure of claim 1 wherein said means for said spring is further characterized as a sleeve whose internal surface frictionally engages a peripheral surface of said spring to brake the response of said spring.

3. The structure of claim 1 wherein said spring is a coil spring whose coils are rubber coated to retard the velocity of deflection whereby harmonics do not amplify and react within the spring to cause fluctuation of said valve.

4. The structure of claim 1 wherein said spring has an intermediate section dividing said spring into first and second portions to prevent harmonic spring motion from interfering with valve operation by reducing spring column length.

5. The structure of claim 4 wherein said spring is a coil spring and the intermediate section is a coil normal to the axis of the spring for at least 180° of the circle prescribed by the coils.

6. A pump means having a housing with a reciprocating plunger operatively arranged therein, an area for maintaining a supply of hydraulic fluid, a pumping chamber, a discharge port, passage means in said housing, a first portion of which communicates the area to the pumping chamber, a second portion of which communicates the pumping chamber to the discharge port, a valve means operatively related to said second portion and said chamber to port pressurized fluid from said chamber to said discharge port and prevent return flow from said discharge port to said chamber, which pump means is characterized by the incorporation of means to regulate the communication of the area to the inlet in response to the magnitude of pressure at said discharge port, said means comprising:

a valve body having a resilient valve seat adapted to cooperate with said first portion of the passage means;

a plunger operatively connected to said valve body and responsive to the pressure at said discharge port to, under pressure from said discharge port, urge said valve seat to a position closing communication of said area to said chamber;

a resilient member operatively connected to said valve body to oppose the effect of pressure on said plunger biasing said valve seat to a closed position, said resilient member having means associated therewith to resist acceleration of its structure in a plane lateral to its length whereby harmonic vibrations will not interfere with the opening and closing of the valve seat.

7. The structure of claim 6 wherein said means associated with said resilient member is a sleeve reinforcing the column profile of said resilient member.

8. The structure of claim 6 wherein said means associated with said resilient member is a coating which resists lateral displacement of said resilient member.

9. The structure of claim 6 wherein said means associated with said resilient member is a lateral reinforcement partition in said resilient member.

10. The structure of claim 6 wherein said resilient member is a coil spring and said means associated therewith is a sleeve snugly fitted about the peripheral surface of the coils of said spring.

11. The structure of claim 6 wherein said resilient member is a coil spring and said means associated therewith is a flexible coating on the coils of said spring closing the space between same such that vibratory lateral displacement of the coils is braked.

12. The structure of claim 6 wherein said resilient member is a coil spring and said means associated therewith is a straight coil for at least 180° around the circumference of said spring between the ends thereof at the location where vibratory excitation most likely occurs due to the fixed nature of the ends.

References Cited

UNITED STATES PATENTS

| 2,450,898 | 10/1948 | Lewis | 103—154 |
| 3,100,449 | 8/1963 | Dahl | 103—2.1 |
| 2,552,778 | 5/1951 | French | 103—41.1 |
| 3,265,007 | 8/1966 | Schultz | 103—228 |

HENRY F. RADVAZO, Primary Examiner

U.S. Cl. X.R.

103—153, 154